May 19, 1936.  B. E. O'HAGAN  2,041,368
ELECTRIC CONTROL SYSTEM
Filed July 14, 1932  2 Sheets-Sheet 1

INVENTOR
Bernard E. O'Hagan
BY
HIS ATTORNEY

UNITED STATES PATENT OFFICE 2,041,368

ELECTRIC CONTROL SYSTEM

Bernard E. O'Hagan, Swissvale, Pa., assignor to The Union Switch & Signal Company, Swissvale, Pa., a corporation of Pennsylvania Application July 14, 1932, Serial No. 622,507

9 Claims. (Cl. 177—353)

My invention relates to electric control systems, and particularly to electric control systems involving means for the control of a mechanism from a distant control point, and means for indicating at the control point the condition of such mechanism.

A feature of my invention resides in the provision of novel and improved apparatus for transmitting from a control point to a remote point over a single control circuit several different control influences for establishing different operating conditions of a mechanism, together with apparatus for returning to the control point over the same control circuit a specific indication influence for each operating condition of the mechanism. Other features of my invention will appear as the specification progresses.

I will describe one form of apparatus embodying my invention, and will then point out the novel features thereof in claims.

Figure 1:
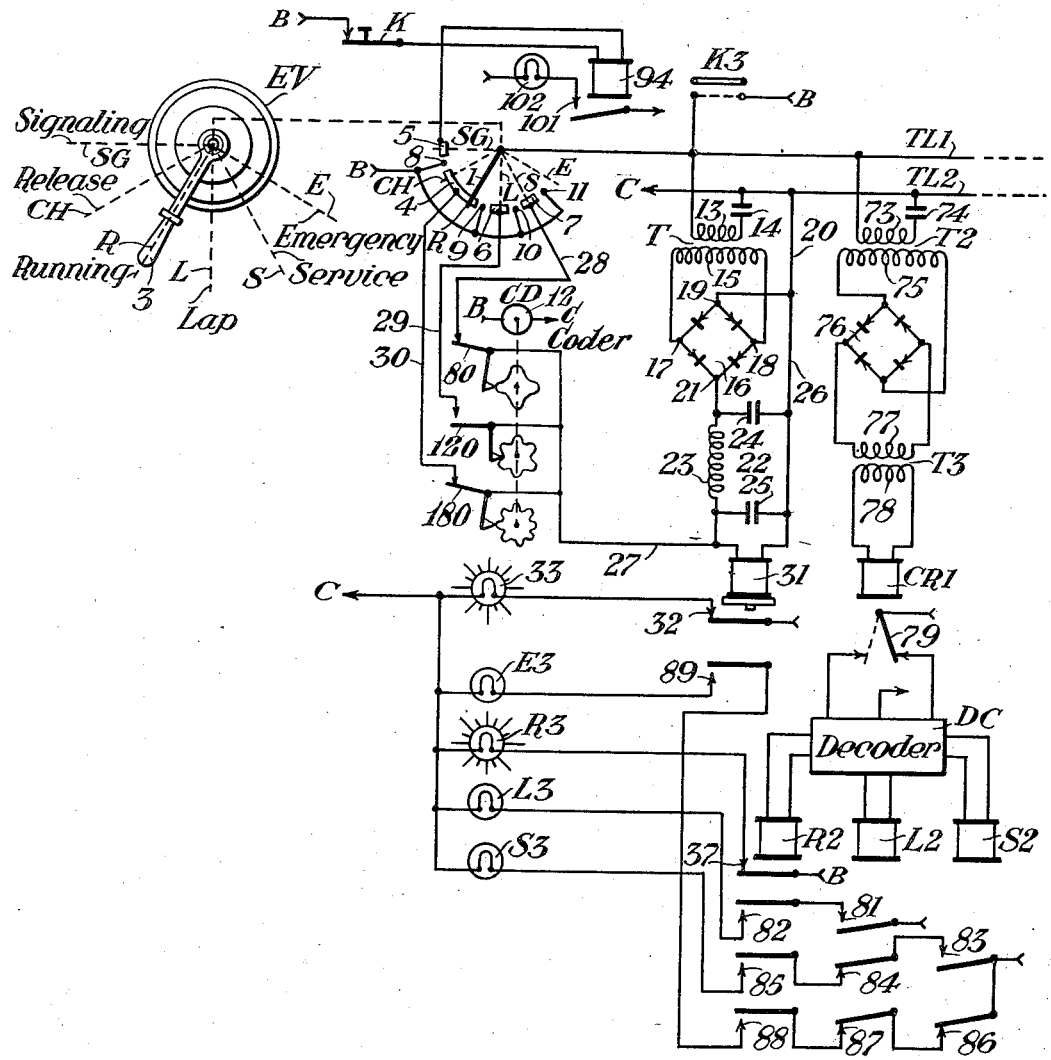
Figure 2:
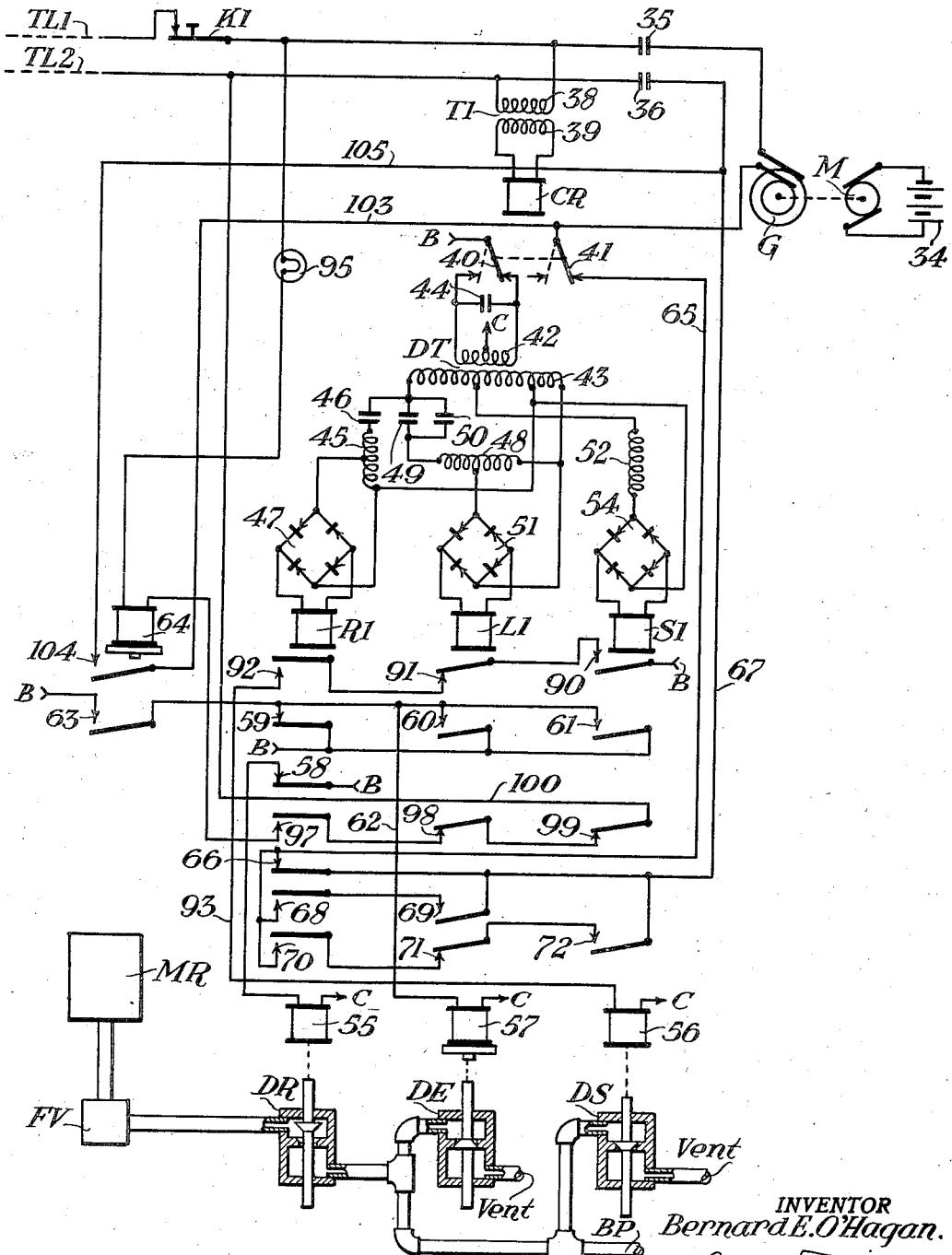

In the accompanying drawings, Figs. 1 and 2 when taken together with Fig. 1 placed at the left constitute a diagrammatic view of one form of apparatus embodying my invention when applied to a railway train brake control system, wherein an auxiliary brake controlling mechanism located at some point on the train other than the locomotive is controlled by different control influences transmitted from the locomotive over a single circuit. Furthermore, apparatus for indicating to the operator on the locomotive the condition of the auxiliary brake controlling mechanism is controlled by different indication influences transmitted over this same circuit. The apparatus is adapted to utilize energy from a single current source for both the control and the indication influences. Numerous other applications for my invention will naturally suggest themselves to those skilled in the art, and it will be understood that I do not limit myself to train brake control systems, but the present application will serve to illustrate the many places where my invention can readily be employed.

The apparatus shown in Fig. 1 is that mounted at the control point, which, in this instance, is on the locomotive. This apparatus is capable of supplying to a control circuit different control influences in accordance with the different positions of the usual engineer's brake valve, and to receive from the same circuit different indication influences for causing the display of different indications. The apparatus of Fig. 2 is that located at a second point on the train. While this apparatus of Fig. 2 may be at any point on the train, it will be referred to in this description as being mounted in the caboose of a freight train. The apparatus of Fig. 2 is capable of receiving from the control circuit the different control influences for causing an auxiliary brake controlling mechanism to reproduce the several functions of the usual engineer's brake valve on the locomotive, and to supply to the control circuit different indication influences corresponding to the different positions of the auxiliary brake controlling mechanism. The control circuit connecting the apparatus of Fig. 1 with the apparatus of Fig. 2 is, in this instance, in the form of two train wires TL1 and TL2 extending from the locomotive to the caboose as indicated in the drawings by dash lines. The single source of current from which energy is obtained for both the control influences and the indication influences is located as will shortly appear, in the caboose. Furthermore, as will appear hereinafter, means are provided whereby signal messages can be communicated between the locomotive and the caboose over this same control circuit.

Referring to Fig. 1, the locomotive is provided with the usual engineer's brake valve designated by the reference character EV, which is adapted to be moved to different positions CH, R, L, S, and E for establishing in the usual manner the release, running, lap, service and emergency conditions, respectively, of the air pressure in the train brake pipe. In addition to these usual functional positions of the engineer's brake valve I propose to modify the valve to the extent that the handle 3 of the valve can be moved beyond the usual release position to an auxiliary position SG, which, as will appear hereinafter, is used for signaling.

As shown schematically a contact arm 1 is connected to and actuated by the handle 3 of the brake valve EV. The contact arm 1 is adapted to engage a contact segment 4 in both the release and running positions, and to engage contact segments 5, 6, and 7 in the signaling position SG, lap position L and service position S, respectively. In the emergency position E the contact arm 1 is disengaged from all contact segments. Midway between the SG and CH positions, the R and L positions, the L and S positions, and the S and E positions, the contact arm 1 engages contacts 8, 9, 10, and 11, respectively. As shown in Fig. 1, the contacts 8, 9, 10, and 11 are each connected to the positive terminal B of a convenient source of current such as a battery not shown, the negative terminal of which is indicated in the drawings by the reference character C. The contact arm 1 is permanently connected to the train wire TL1 of the control circuit. The function of this contact assembly associated with the engineer's brake valve will appear as the specification progresses.

The locomotive is provided with a coder CD of any convenient form and as here shown conventionally the motor element 12 is permanently connected to the terminals B and C of the current source with the result that this coder is continuously active. I will assume that as long as the motor element 12 is energized, the upper code contact designated by the reference character 80 is periodically closed at the rate of eighty times per minute, the middle code contact 120 is periodically closed at the rate of one hundred twenty times per minute, and the bottom code contact 180 is periodically closed at the rate of one hundred eighty times per minute. It will be understood, however, that my invention is not limited to these specific frequencies for the operation of the code contacts, and that other frequencies could be selected should it seem desirable to do so.

A transformer T on the locomotive has its primary winding 13 connected across the train wires TL1 and TL2, a blocking condenser 14 being inserted between the wire TL2 and its winding 13 to prevent direct current flowing from the wires TL1 and TL2 through the winding 13. The secondary winding 15 of transformer T is connected to the input terminals 17 and 18 of a full-wave rectifier 16. The output terminals of rectifier 16 are connected across the train wires TL1 and TL2 through a filter 22, the code contacts of coder CD and the contact assembly associated with the brake valve EV in the following manner. The output terminal 19 of rectifier 16 is connected by a wire 20 to the train wire TL2, and is also connected by wires 20 and 26 to one terminal of each of the high capacity condensers 24 and 25 of filter 22. The other output terminal 21 of rectifier 16 is connected through choke coil 23 of filter 22 and wire 27 to the heel of each of the code contacts 80, 120 and 180 of coder CD, the other terminal of the condensers 24 and 25 being connected respectively at the two opposite ends of the choke coil 23 of filter 22 in the usual manner for such filters. The 80 code contact of coder CD is connected by a wire 28 to the service contact segment 7, the 120 code contact is connected to the lap contact segment 6 by a wire 29, and the 180 code contact is connected to the release and running contact segment 4 by a wire 30. It follows that when alternating current is supplied to the transformer T, the alternating current induced in the secondary 15 is rectified by the rectifier 16 and is supplied through the code contacts as impulses of direct current to the train wires TL1 and TL2, the code frequency of the impulses being selected by the position of the engineer's brake valve EV. When the handle 3 occupies either the release position CH or the running position R, the code frequency of the direct current impulses is that of one hundred eighty per minute. When the handle 3 is moved to the lap position L, the code frequency of the direct impulses is that of one hundred twenty per minute. When the handle 3 is moved to the service position S, the code frequency is that of eighty per minute. When the handle 3 is moved either to the emergency position E or to the signaling position SG, the connection from the code contacts is broken and the code impulses are discontinued. The condensers 24 and 25 being normally charged by the direct current output of the rectifier 16 they will discharge to continue for an interval the impulse of direct current to the train wires in the event the supply of alternating current is interrupted, providing, of course, that one of the code contacts of the coder CD is closed at the time. That is to say, the condensers 24 and 25 are so proportioned, that, when the supply of the alternating current is interrupted in a manner to be later described, just after a code contact is closed, the discharge from the condensers 24 and 25 will continue the supply of direct current to the train wires until the code contact is next opened. It is to be noted, as stated above, that the condenser 14 acts as a blocking condenser to keep the direct current from flowing in the primary winding 13 of transformer T.

A power failure relay 31 is connected across the output of the rectifier 16, and the winding of this relay has a relatively high resistance to avoid discharging the condensers 24 and 25 under certain conditions to be described later. It follows that relay 31 is normally retained energized by the direct current output of the rectifier 16 to close at its front contact 32 a simple circuit to a power indicator lamp 33. The relay 31 is slow releasing in character to prevent it from releasing its front contact 32 when the output of rectifier 16 is periodically interrupted in a manner to appear later.

Referring to Fig. 2, the caboose is provided with a source of alternating current of any convenient frequency such, for example, as sixty cycles per second, and this source as here shown is a generator G driven by a motor M which is operated by energy supplied from a battery 34. One terminal of generator G is connected directly to the train wire TL1 through a blocking condenser 35, and a spring return key K1, while its other terminal is connected to the other train wire TL2 through a blocking condenser 36 and a circuit network to be shortly described in detail.

Mounted in the caboose is a master code following relay CR supplied with current from the train wires TL1 and TL2 through the medium of a transformer T1. For each impulse of coded direct current supplied from the wires TL1 and TL2 to the primary winding 38, during the increase of such direct current, an impulse of current of one relative polarity is supplied to the relay CR from the secondary 39, and during the decrease of such direct current an impulse of current of the opposite relative polarity is supplied to the relay CR. Relay CR is a direct current polar relay responsive to the relative polarity of the current impulse supplied thereto, and it follows that when coded direct current is supplied from the wires TL1 and TL2 to the transformer T1, the relay CR is operated to swing its armatures 40 and 41 alternately to the right and left at a frequency which corresponds to the frequency of the code impulses of direct current. Relay CR is so arranged that the relative polarity of the current impulse supplied to its winding during the increase period of the direct current impulse flowing in the primary winding 38, is such as to cause the armatures 40 and 41 to swing to the left, that is, to the position indicated by the dotted lines in the drawings. The relative polarity of the current impulse supplied to relay CR during the decrease period of the direct current impulse flowing in the primary winding 38 is such as to cause the armatures 40 and 41 to swing to the right, that is, to the position indicated by the solid lines in the drawings. Alternating current supplied to wires TL1 and TL2 from the generator G will induce an alternating current in the secondary 39 of transformer T1. The windings of the transformer T1 and of the relay CR are so selected and proportioned as to offer such high impedance to such alternating current that the relay CR is not energized by the alternating current, or that it is energized insufficiently to cause any appreciable operation of its armatures 40 and 41.

The code following relay CR controls decoding apparatus involving three relays R1, L1, and S1 in such a manner that these three relays are selectively responsive to the three code frequencies of one hundred eighty, one hundred twenty and eighty per minute. This decoding apparatus includes a transformer DT the primary winding 42 of which is supplied with direct current through the armature 40 of the code following relay CR. When armature 40 is swung to the right, current is supplied from the positive terminal B of a current source through the right-hand half of the primary winding 42, and when armature 40 is swung to the left, current is supplied to the left-hand half of winding 42 in a similar manner. It follows that when relay CR is operated, an alternating voltage is induced in the secondary 43 of transformer DT the frequency of which corresponds to the frequency at which relay CR is operated. A condenser 44 may be connected across the primary 42 to reduce the sparking at the contacts of armature 40. Transformer DT is provided with a first secondary circuit which includes a reactor 45 and a condenser 46 in series. A portion of reactor 45 is connected across the input terminals of a full-wave rectifier 47, the output terminals of which are connected to the winding of relay R1. The parts of this circuit are so proportioned and adjusted that relay R1 will respond when relay CR is operated by the 180 code direct current impulses and not when relay CR is operated at other code frequencies. Transformer DT is provided with a second secondary circuit which includes a reactor 48 in series with two condensers 49 and 50 arranged in parallel. A portion of reactor 48 is connected across the input terminals of a rectifier 51 the output of which is connected to the winding of the relay L1. The parts of this circuit are so proportioned and adjusted that the relay L1 will respond when the code relay CR is operated at 120 code frequency and not when it is operated at other code frequencies. Transformer DT is provided wih a third secondary circuit which includes a reactor 52 and a full-wave rectifier 54 in series, the output terminals of rectifier 54 being connected to the winding of relay S1. This circuit is non-tuned and relay S1 will respond when relay CR is operated at any of the three code frequencies.

The caboose is equipped with an auxiliary brake controlling mechanism which includes a main reservoir MR, a feed valve FV, and electropneumatic valves DR, DE and DS. The caboose, of course, will also be equipped with a compressor, pressure gages and all other apparatus necessary to insure an ample supply of air pressure in its main reservoir MR for controlling the train brakes independently of the usual supply of air pressure provided on the locomotive. The valves DR and DS are biased to the closed position, and are lifted to the open position when their magnets 55 and 56, respectively, are energized. The valve DE is biased to the open position, and is closed when its magnet 57 is energized. When the valve DR is opened by its magnet 55 being energized, the train brake pipe BP is connected to the feed valve FV, and the auxiliary brake controlling mechanism then reproduces the running condition of the engineer's brake valve on the locomotive. When the valve DS is opened by its magnet 56 being energized, the brake pipe BP is connected to the atmosphere through a vent of such characteristics as to effect a service application of the brakes. When valve DE is opened due to its magnet 57 being deenergized, brake pipe BP is connected to atmosphere through a vent of such characteristics as to produce an emergency application of the train brakes. When the valve DE is held closed by the energizing of its magnet 57 and both valves DR and DS are closed as the result of their respective magnets 55 and 56 being deenergized, both the supply and the exhaust of the brake pipe are blanked, and the auxiliary brake controlling mechanism in the caboose then reproduces the lap condition of the engineer's brake valve.

The magnet 55 of valve DR is provided with a simple circuit which includes the front contact 58 of relay R1 and thus the magnet 55 is energized and valve DR held open whenever relay R1 is picked up. The magnet 57 is provided with an energizing circuit that can be traced from the positive terminal B of the current source, through the front contact 59 of relay R1, or the front contact 60 of relay L1, or the front contact 61 of relay S1, and thence by the wire 62 and the winding of magnet 57 to the terminal C of the current source. Current can also be supplied to magnet 57 over the front contact 63 of a signaling relay 64 to be described later, as will be readily understood by an inspection of Fig. 2. Thus, magnet 57 will be energized and the valve DE held closed when any one of the control relays R1, L1 or S1 is picked up, and also when the signaling relay 64 is energized. Magnet 57 is slow releasing in character to retain valve DE closed during the change from one control condition to another, and also during the change from a control condition to the signaling condition as will appear when the operation of the system is described. The magnet 56 is provided with a circuit that passes from terminal B, through front contact 90 of relay S1, back contacts 91 and 92 of relays L1 and R1, respectively, wire 93 and winding of magnet 56 to the terminal C. Thus picking up the control relay S1 causes the magnet 56 to be energized to effect a service application of the train brakes.

The code following relay CR, by operating its second armature 41 which is included in the connection between the generator G and the train wire TL2, will interrupt the supply of alternating current at a rate corresponding to the code frequency at which it is operated. That is to say, relay CR, when operated at the 180 code frequency, will interrupt the supply of alternating current from generator G at the rate of one hundred eighty times per minute. Relay CR, when operated at the 120 code frequency, will interrupt the alternating current supply at the rate of one hundred twenty times per minute, and when operated at 80 code frequency, the supply of alternating current will be interrupted eighty times per minute. Thus the code following relay CR not only acts as a means for interpreting the different codes of direct current supplied to the train wires TL1 and TL2, but it also acts as a code transmitting means for coding the alternating current supplied to the train wires from the generator G. To check the position of the control relays R1, L1 and S1 the connection from generator G to the train wire TL2 is controlled by contacts of these relays. To be explicit, when code following relay CR is operated by 180 code direct current and relay R1 picked up, the connection of generator G to wire TL2 extends through armature 41 in its right-hand position, wire 65, front contact 66 of relay R1, wire 67 and blocking condenser 36 to the train wire TL2. When relay CR is operated by 120 code direct current and relay L1 picked up, the connection from generator G extends through armature 41, wire 65, back contact 68 of relay R1, front contact 69 of relay L1 and thence by wire 67 and condenser 36 to the train wire TL2. When relay CR is operated by 80 code direct current and relay S1 picked up, the connection from generator G includes armature 41, wire 65, back contacts 70 and 71 of relays R1 and L1, respectively, front contact 72 of relay S1 and thence to the train wire TL2 as before pointed out. It follows that the alternating current supplied to the train wires TL1 and TL2 from the generator G is interrupted at the frequency of the incoming code of direct current operating the relay CR, the connection being completed when the positions of the control relays correspond with the incoming code. While the connection from the generator G is governed by contacts operated by the control relays R1, L1 and S1 as traced above, it will be understood that these controlling contacts could be operated directly by the brake valve magnets 55, 56 and 57 which in turn are controlled by the relays should it seem desirable. Furthermore, instead of having the magnet 57 of the emergency brake valve DE serve as the magnet to be normally retained energized to insure a closed circuit principle for my system, it will be understood that the magnet of either of the other brake valves could be so arranged should it seem desirable.

Referring again to Fig. 1, a transformer T2 on the locomotive has its primary winding 73 connected across the train wires TL1 and TL2 through a blocking condenser 74, and its secondary winding 75 connected to the input terminals of a full-wave rectifier 76. The output terminals of rectifier 76 are connected to the terminals of the primary winding 77 of a transformer T3 the secondary winding 78 of which is connected to a code following relay CR1. From the foregoing it is clear that alternating current flowing in the train wires TL1 and TL2 induces an alternating current in the secondary 75 of transformer T2. This alternating current supplied from the secondary 75 is rectified and made to flow in the primary winding 77 of transformer T3 as direct current. With the alternating current flowing in wires TL1 and TL2 periodically interrupted, then, impulses of direct current will flow in the primary 77 of transformer T3. For every impulse of direct current supplied to the primary winding 77, during the increase of such impulse an impulse of current of one relative polarity is supplied to the relay CR1 from the secondary 78, and during the decrease of such impulse in the primary winding 77 an impulse of current of opposite relative polarity is supplied to the relay CR1. Relay CR1 is a direct current polar relay responsive to the relative polarity of the current supplied thereto. Thus, during each period that alternating current is made to flow in the train wires TL1 and TL2 an impulse of direct current is made to flow in the primary 77 of transformer T3 the building up and dying away of which induces an impulse of current in the secondary 78 to operate the code following relay CR1 to swing its armature 79 alternately to the right and left. Any direct current flowing in the train wires TL1 and TL2 is blocked out of the primary winding 73 of transformer T2 by the blocking condenser 74.

The relay CR1 controls the relays R2, L2 and S2 through the medium of a decoder DC. This decoder may be any one of several well-known types, and is preferably of the same type as that shown in Fig. 2 and described hereinbefore. Decoder DC controls three relays R2, L2 and S2. When relay CR1 is operated at a code frequency of one hundred eighty per minute, the relay R2 responds. When relay CR1 is operated at a code frequency of one hundred twenty per minute, relay L2 responds, while relay S2 responds with relay CR1 operated at any one of three code frequencies. When relay CR1 is not operated, all three of these control relays are deenergized.

With relay R2 picked up in response to 180 code, current is supplied to the indication lamp R3 by a circuit which includes the front contact 37 of relay R2. When relay L2 is operated in response to 120 code, a circuit for the indication lamp L3 is completed which includes the front contact 81 of relay L2 and the back contact 82 of relay R2. When relay CR1 is operated in response to 80 code, the closing of relay S2 closes a circuit to the indication lamp S3, which circuit includes the front contact 83 of relay S2 and the back contacts 84 and 85 of relays L2 and R2, respectively. When all three relays R2, L2 and S2 are deenergized and the power failure relay 31 is also deenergized, a circuit is completed for the indication lamp E3 which includes the back contacts 86, 87, 88, and 89 in series.

In describing the operation of my system I will assume that the handle 3 of the engineer's brake valve EV is first moved to the position midway between the lap position L and the running position R, and is then moved from this mid position to the running position at which point it is left to establish the running condition of the train brakes in the usual manner. While the contact arm 1 engages the contact 9, steady direct current is supplied to the train wires TL1 and TL2 to energize the relay 64 in the caboose. This circuit for energizing relay 64 can be traced from the terminal B of the source of current through contact 9, contact arm 1, train wire TL1, key K1, a signaling lamp 95, winding of relay 64, back contacts 97, 98 and 99 of control relays R1, L1 and S1, respectively, wire 100, and train wire TL2 to the opposite terminal C of the same source of steady direct current. As relay 64 picks up, it completes the connection from the generator G to the train wire TL2 through wire 103, front contact 104 and wire 105. Relay 64 being slow releasing in character, the generator G supplies alternating current to the train wires during its release period after handle 3 has been moved from the mid position to the running position and relay 64 deenergized. This alternating current flowing in the primary 13 of the transformer T on the locomotive induces an alternating current in its secondary 15 which is rectified by rectifier 16 to charge the high capacity condensers 24 and 25 and to apply direct current to the code contacts of coder CD. The handle 3 being now in the running position, the 180 code contact is selected and impulses of direct current at the code frequency of one hundred eighty per minute are supplied to the train wires. These code impulses of direct current operate the code following relay CR in the caboose at a corresponding rate to bring about the energizing of the relay RI. As relay RI picks up, the magnet 55 is energized to open the valve DR, and a circuit is closed to the magnet 57 of valve DE, the magnet 57 having been previously energized over the front contact 63 of relay 64 when that relay was first picked up. Valve DR is now open, and valves DE and DS are both closed, and thus the auxiliary brake controlling mechanism in the caboose reproduces the running condition of the train brake pipe pressure established by the engineer's valve EV on the locomotive. At the end of the release period of relay 64, that relay drops to open its front contact 104 through which alternating current is being supplied to the train wires from the generator G. The opening of the front contact 63 as relay 64 releases opens the path by which magnet 57 was first energized, but current is now supplied to that magnet through the path including the front contact 59 of relay RI. The connection from generator G to the train wires is now completed through the right-hand contact of armature 41 of relay CR and the front contact 66 of relay RI. The first closing of the 180 code contact of coder CD after relay 64 releases will supply an impulse of direct current to the train wires, the increase period of which will cause the code following relay CR to swing its armature 41 to the left-hand position as heretofore described, whereby the supply of alternating current will be interrupted. The high capacity condensers 24 and 25 now discharge to continue the supply of direct current to the train wires and hence to the primary 38 of the caboose transformer T1 until the code contact 180 of coder CD again opens. As described hereinbefore, the decay of the code impulse of direct current will cause relay CR to swing its armature 41 to the right-hand position where it again closes the connection for supplying alternating current to the train wires. The flow of alternating current reestablishes the flow of rectified current to recharge the high capacity condensers 24 and 25 and to start the next code impulse of direct current. This action is then repeated at the next cycle, and at each succeeding cycle of the 180 code contact of the coder CD. Thus, it will be seen that the code following relay CR in the caboose and its associated decoding apparatus serve to decode the 180 code direct current impulses for energizing the control relay RI, which causes the auxiliary brake controlling mechanism to establish the running condition of the train brakes. Furthermore, relay CR serves as a code transmitter for coding the alternating current supplied to the train wires in agreement with the 180 code impulses of direct current received from the locomotive.

The 180 code impulses of alternating current now supplied to the train wires not only supply the energy for recharging the condensers 24 and 25 and the starting of the direct current code impulses, but these alternating current code impulses also cause corresponding impulses of direct current to flow in the primary winding 77 of transformer T3 on the locomotive. As previously pointed out, these impulses of direct current flowing in primary 77 causes the code following relay CR1 to be operated at a corresponding frequency. The code frequency being now one hundred eighty per minute, the relay R2 is responsive, and current is supplied to the lamp R3 to display an indication to the operator on the locomotive that the running condition of the apparatus in the caboose has been established in response to the running position of his brake valve EV.

If the operator next moves the valve handle 3 to the service position to cause a service application of the train brakes, the contact arm 1 engages the segment 7 to select the 80 code contact of coder CD, and the direct current impulses supplied to the train wires are coded at the rate of eighty per minute, and relay CR in the caboose is then operated at a corresponding rate to retain the relay S1 energized. With relay S1 only picked up, the magnet 56 is energized to open valve DS, and the magnet 57 of valve DE is supplied with current over the front contact 61 of relay S1, so that valve DE is retained closed. The auxiliary brake controlling mechanism then reproduces the service brake application condition established by the engineer's valve EV. The supply of alternating current is now over the front contacts 72 of relay S1 and the back contacts 70 and 71 of relays R1 and L1, respectively, and is interrupted by the armature 41 of relay CR at the code frequency of eighty per minute. This causes the relay CR1 to be operated at a corresponding frequency, so that relay S2 is selected. With relay S2 picked up to close its front contact 83, current is supplied to the indication lamp S3 to indicate to the operator on the locomotive that the caboose apparatus is in service condition.

Placing the handle 3 of valve EV at the lap position to establish the lap condition of the train brakes, will cause the 120 code contact to be selected, and direct current impulses will be supplied to the train wires at that frequency. The relay CR in the caboose is now operated at the same frequency to select relay L1. When relay L1 picks up, magnet 57 will be energized to hold the valve DE closed, but both magnets 55 and 56 will be without current and so both valves DR and DS will be closed by their biasing elements. This condition of the valves in the caboose blanks both the supply and the exhaust of the brake pipe, and the auxiliary brake controlling mechanism then reproduces the lap condition established by the valve EV. The circuit for supplying alternating current to the train wires now includes the front contact 69 of relay L1, and the supply of alternating current is interrupted by the armature 41 of relay CR at the frequency of one hundred twenty per minute. This 120 code causes relay CR1 to be operated at a corresponding frequency, and so the relay L2 is selected to supply over its front contact 81 current to the indication lamp L3. That is to say, the lamp L3 is now lighted to indicate to the operator on the locomotive the lap condition of the caboose apparatus.

When the valve EV is moved to the emergency position the code impulses of direct current are discontinued and the relay CR in the caboose ceases to be operated, so that all three of the relays R1, L1 and S1 become deenergized. With all of these control relays in the caboose deenergized, the magnet 57 is without current and the valve DE is opened, causing the auxiliary mechanism to reproduce the emergency brake condition established by valve EV. There will now be no impulses of alternating current supplied to the train wires for operating the code following relay CR1, and thus all three relays R2, L2 and S2 become deenergized. No alternating current being now supplied to the train wires, current ceases to flow in the output of the rectifier 16 and the power failure relay 31 becomes deenergized to release its armatures at the end of its release period. Current is now supplied to the indication lamp E3 over the back contacts of each of the control relays on the locomotive, and this lamp E3 is lighted to indicate to the operator the emergency condition of the caboose apparatus. To release the brakes, the operator will move the handle 3 to some one of the other operating positions. As the handle 3 is being moved, the contact arm 1 will engage one of the contacts 11, 10 or 9, and steady direct current will be supplied to the train wires for energizing the relay 64. Once the relay 64 is picked up, the operation of the system will be clear from the foregoing explanation.

To sum up thus far, alternating current is supplied by the generator G in the caboose to the two train wires, and this current is rectified at the locomotive to charge high capacity condensers and to supply coded direct current impulses to the two train wires in accordance with the position of the engineer's brake valve. The code impulses of direct current operate the master code relay CR in the caboose to select the proper control relay for causing the auxiliary brake controlling mechanism to reproduce the brake control condition established by the valve EV. The code following relay CR also serves to code the alternating current in agreement with the code at which it is operated and the position of the caboose apparatus. The high capacity condensers on the locomotive discharge to complete the direct current impulse after the code following relay in the caboose has interrupted the supply of alternating current. On the locomotive a code following relay responsive only to coded alternating current together with an associated decoding unit establishes an indication circuit for indicating on the locomotive the condition of the caboose apparatus.

In the event the operator on the locomotive desires to signal to the crew in the caboose he will move his valve handle 3 to the signaling position SG where the direct current code impulses are discontinued and a steady direct current supplied to the train wires for energizing the relay 64 in the caboose and also a signaling relay 94 on the locomotive. This signaling circuit can be traced from the positive terminal B through a spring returned key K, winding of relay 94, contact segment 5, contact arm 1, train wire TL1, spring returned key K1 in the caboose, signal lamp 95, winding of relay 64, back contacts 97, 98 and 99 of relays R1, L1 and S1, respectively, wire 100 and train wire TL2 to the terminal C of the source of current. The magnet 57 of valve DE will now be retained energized by current over the front contact 63 of relay 64 to prevent the establishing of a braking condition by the auxiliary mechanism. It will be understood that the valve EV has its ports so arranged that no braking condition is established when its handle 3 is moved to this signaling position SG. The operator on the locomotive, by operating the key K in accordance with a prearranged code, will cause a corresponding flashing of the signal lamp 95 in the caboose to convey to the caboose crew the code message desired. The operator in the caboose can transmit a return code message by operating the key K1 in accordance with the prearranged code. Each momentary rupture of this signaling circuit causes the relay 94 on the locomotive to be deenergized, and thereby causes the flashing of the signal lamp 102 which is energized over the front contact 101 of relay 94. When the signal message is completed the operator will move the brake valve handle 3 to any desired functional position and the usual operation of the system will be reestablished. On the locomotive an emergency switch K3 is provided which when moved to its dotted line position causes steady direct current to be supplied to the train wires to retain the relay 64 in the caboose energized in the event of a failure of the apparatus.

It is obvious from Fig. 1 that the power failure relay 31 with its associated signal lamp 33 provides a continuous indication to the operator of the presence of operating current. As stated earlier in the specification, relay 31 is wound to a relatively high resistance to avoid discharging the condensers 24 and 25 during the open circuit period of the contact 41 of the code relay CR which controls the supply of alternating current.

It will be seen from the foregoing that two mechanisms each having several different operating conditions and located at spaced points are selectively controlled, each by a controlling means located at the other point, and that this double control is accomplished by means of a single two wire circuit and only one source of current.

Although I have herein shown and described only one form of apparatus embodying my invention, it is understood that various changes and modifications may be made therein within the scope of the appended claims without departing from the spirit and scope of my invention.

Having thus described my invention, what I claim is:

1. A control system including a pair of wires extending between two spaced locations, a current source at one location for supplying alternating current to said wires, means including a rectifier at the other location receiving alternating current from said wires and supplying coded direct current at different codes to said wires, a code responsive means at the first mentioned location connected with said wires and selectively influenced by the different codes of direct current for establishing different operating conditions of an operating mechanism, means controlled by said code responsive means for coding at different codes the alternating current, means controlled by the operating mechanism for governing the connection of said source to said wires, and code following means at said other location selectively responsive to the different codes of alternating current for establishing different conditions of an indicating mechanism.

2. A control system including a first mechanism having a plurality of different operating conditions located at a first point, a second mechanism having conditions corresponding to those of the first mechanism and located at a second point, a pair of control wires extending between the two points, a current source at the first point for supplying to said control wires alternating current, converting means at the second point connected with said wires receiving alternating current and supplying direct current, a control means including a coding device and having different positions for supplying from said converting means coded direct current at different codes to said wires, a code responsive means connected with said wires at the first point selectively responsive to the different codes of direct current for establishing the different operating conditions of the first mechanism, means controlled by said code responsive means to code the alternating current in accordance with the direct current code, means controlled by said first mechanism for governing the connection of said source to said wires, and a code responsive means connected with said wires at the second point selectively responsive to the different codes of alternating current for causing the second mechanism to register with the code at which said first mentioned code responsive means is operated.

3. A control system including a pair of control wires extending between two spaced locations, coding means at one location adapted to supply to the control wires current coded at different codes, code responsive means connected to the wires at the other location selectively responsive to different codes of direct current for establishing different conditions of an operating mechanism, other coding means controlled by said code responsive means for supplying coded alternating current at different codes, means controlled by the operating mechanism for connecting said other coding means to said wires, code responsive means connected with the wires at the first mentioned location selectively responsive to the different codes of alternating current for establishing different conditions of an indicating device, and means including a rectifier and a condenser connected with the wires at said first mentioned location receiving such coded alternating current for supplying direct current to the coding means at that location.

4. A control system including a mechanism at each of two spaced locations and which have a plurality of corresponding positions, a pair of control wires between the two locations, a current source adapted to supply to said wires at one of the locations alternating current, means including a rectifier receiving alternating current from said wires at the other location, controlling means connected with the output of said rectifier for supplying to said control wires direct current coded at different codes, a code following relay connected with the wires at the first mentioned location responsive to coded direct current, decoding means controlled by said relay selectively responsive to the different codes of direct current for establishing a corresponding position of the mechanism at that location, circuit means governed by said relay arranged to interrupt the alternating current in response to the increase portion of each code impulse of direct current to thereby code the alternating current at different codes, means controlled by the mechanism at said one location for connecting said circuit means with said wires, a code responsive means connected with said wires at said other location selectively responsive to the different codes of alternating current for establishing a corresponding position of the mechanism at said other location, and means including a condenser connected across the output of the rectifier for maintaining the supply of direct current to said wires during the remaining portion of the direct current code impulse after the interruption of the alternating current.

5. In a control system including a control mechanism at one location, a controlled mechanism at another location, a circuit between said locations, direct current code responsive means at said other location for governing the controlled mechanism and connected with said circuit, and coding means at said one location governed by said control means and connected with said circuit; the combination with the above instrumentalities of a source of alternating current at said other location connected with said circuit, a rectifier at said one location having its input terminals connected to said circuit and its output terminals connected with the coding means for operating the code responsive means by energy supplied by said alternating current source, and indicating means including a relay connected across the output terminals of the rectifier whereby the presence of energy and the integrity of the circuit are indicated at said one location.

6. In a control system including a control mechanism at one location, a controlled mechanism at another location, a circuit between said locations, direct current code responsive means at said other location for governing the controlled mechanism and connected with the circuit, and coding means at said one location governed by the control mechanism and connected with the circuit; the combination with the above instrumentalities of a source of alternating current at said other location, a direct current relay at said other location connected with the circuit, a first means for connecting the source with said circuit including a front contact of said relay, a second means for connecting the source with said circuit including a contact operated by the code responsive means, a rectifier at said one location having its input terminals connected with the circuit and its output terminals connected with the coding means for operating the code responsive means by energy supplied from said source, and manually controlled means at said one location effective to supply direct current to the circuit for energizing said relay for initially supplying alternating current to the circuit.

7. In a control system including a control mechanism at one location, a controlled mechanism at another location, a circuit between said locations, code responsive means at said other location for governing the controlled mechanism and connected with the circuit, and coding means at said one location governed by the control mechanism and connected with the circuit for supplying coded current for governing the controlled mechanism in accordance with the control mechanism; the combination with the above instrumentalities of a signaling means consisting of a slow releasing relay and a signal device at said other location and connected with the circuit in series, manually controlled means at said one location effective to render the coding means inactive and to supply a signaling current to the circuit for intermittently energizing said relay and signal device in accordance with a signaling code, and means effective to establish a predetermined condition of said controlled mechanism including a front contact of said relay.

8. A control system including a pair of wires extending between two spaced locations, a current source at one location for supplying alternating current to said wires, means including a rectifier and a coder at the other location receiving alternating current from said wires and supplying coded direct current, control means at said other location operative to supply such coded direct current to said wires, a code responsive means at the first mentioned location connected with said wires and effectively influenced by such coded direct current for establishing a given condition of an operating mechanism, means controlled by said code responsive means for periodically interrupting the alternating current, and indicating means at said other location connected with said wires and effectively influenced by such interrupted alternating current.

9. A control system including a pair of wires extending between two locations, a current source at one location for supplying alternating current to said wires, means including a rectifier at the other location connected across the wires for supplying direct current, means including a coder connected across the output terminals of the rectifier for coding the direct current, control means at said other location operative to supply such coded direct current to said wires, a code responsive means at the first mentioned location connected with said wires and effectively influenced by such coded direct current for establishing a given condition of an operating mechanism, means controlled by said code responsive means for periodically interrupting the alternating current, indicating means at said other location connected with said wires and effectively influenced by such interrupted alternating current, and means including a condenser connected across the output terminals of the rectifier effective if the alternating current is interrupted during a code impulse for continuing the flow of direct current for a period at least equal to the remaining portion of such code impulse.

BERNARD E. O'HAGAN.